US012174392B2

(12) United States Patent
Weng et al.

(10) Patent No.: US 12,174,392 B2
(45) Date of Patent: Dec. 24, 2024

(54) OPTICAL SYSTEM

(71) Applicant: TDK TAIWAN CORP., Taoyuan (TW)

(72) Inventors: Chih-Wei Weng, Taoyuan (TW);
Chao-Chang Hu, Taoyuan (TW);
Cheng-Jui Chang, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 18/467,375

(22) Filed: Sep. 14, 2023

(65) Prior Publication Data
US 2024/0094542 A1 Mar. 21, 2024

Related U.S. Application Data

(60) Provisional application No. 63/406,916, filed on Sep. 15, 2022.

(51) Int. Cl.
*G02B 27/00* (2006.01)
*F21V 8/00* (2006.01)
*G02B 7/08* (2021.01)
*G02B 7/36* (2021.01)
*G02B 27/01* (2006.01)
*G02B 27/64* (2006.01)
*G03B 5/00* (2021.01)
*G06F 3/01* (2006.01)
*G09G 3/00* (2006.01)
*H01F 7/08* (2006.01)
*H04N 23/54* (2023.01)
(Continued)

(52) U.S. Cl.
CPC ....... *G02B 27/0176* (2013.01); *G02B 6/0006* (2013.01); *G02B 6/0028* (2013.01); *G02B 7/08* (2013.01); *G02B 7/36* (2013.01); *G02B 27/0172* (2013.01); *G02B 27/0179* (2013.01); *G02B 27/646* (2013.01); *G03B 5/00* (2013.01); *G06F 3/013* (2013.01); *G09G 3/001* (2013.01); *H01F 7/081* (2013.01); *H04N 23/54* (2023.01); *H04N 23/55* (2023.01); *H04N 23/6812* (2023.01); *G02B 2027/0112* (2013.01); *G02B 2027/015* (2013.01); *G02B 2027/0159* (2013.01); *G02B 2027/0178* (2013.01); *G02B 2027/0187* (2013.01); *G02B 2207/101* (2013.01); *G03B 2205/0076* (2013.01); *G09G 2354/00* (2013.01)

(58) Field of Classification Search
None
See application file for complete search history.

(56) References Cited

U.S. PATENT DOCUMENTS

2020/0183152 A1* 6/2020 Pennell ................ G02B 27/141
2021/0263324 A1* 8/2021 Kim ..................... G02B 27/0172

\* cited by examiner

*Primary Examiner* — Carl Adams
(74) *Attorney, Agent, or Firm* — MUNCY, GEISSLER, OLDS & LOWE, P.C.

(57) ABSTRACT

An optical system is provided. The optical system includes a light source assembly, a light guiding element, and a first optical assembly. The light source assembly is used for generating first light and second light. The light guiding element is used for transporting the first light and the second light. The first optical assembly is disposed between the light guiding element and the light source assembly and used for transporting the first light and the second light. Wavelengths of the first light and the second light are different.

18 Claims, 13 Drawing Sheets

(51) Int. Cl.
*H04N 23/55* (2023.01)
*H04N 23/68* (2023.01)

OPTICAL SYSTEM

CROSS REFERENCE TO RELATED APPLICATIONS

This application claims priority of U.S. Provisional Application No. 63/406,916, filed on Sep. 15, 2022, the entirety of which is incorporated by reference herein.

BACKGROUND OF THE INVENTION

Field of the Invention

The present disclosure relates to an optical system.

Description of the Related Art

Augmented Reality (AR) is a technology that combines elements of the virtual world with the real world, allowing users to place virtual objects or information into their real environment through the camera lens of a device. Current AR optical systems are primarily based on optical projection technology, typically using a camera to capture images from the real world and a projector to deliver virtual content, thereby superimposing virtual elements onto the user's field of view along with the images from the real world.

Virtual Reality (VR) is a simulated virtual environment created through computer technology and sensor techniques, allowing users to experience a sense of being present in that environment. The optical system of virtual reality is one of the key technologies within VR, responsible for capturing, processing, and delivering visual information, enabling users to perceive realistic virtual scenes. Mixed Reality (MR) is a technology that combines elements of both virtual reality and augmented reality.

However, current augmented reality, virtual reality, or mixed reality devices typically require large and bulky optical assemblies, which limit their portability and user comfort. Users may not want to wear oversized devices on their heads, thus improving the size of augmented reality optical systems is an important challenge.

BRIEF SUMMARY OF THE INVENTION

An optical system is provided. The optical system includes a light source assembly, a light guiding element, and a first optical assembly. The light source assembly is used for generating first light and second light. The light guiding element is used for transporting the first light and the second light. The first optical assembly is disposed between the light guiding element and the light source assembly and used for transporting the first light and the second light. Wavelengths of the first light and the second light are different.

In some embodiments, the first optical assembly includes a first optical element. The first optical element includes a substrate, a plurality of first microstructures, and a plurality of second microstructures. The first microstructures and the second microstructures are disposed on the substrate. The first microstructures are used for diffracting the first light. The second microstructures are used for diffracting the second light.

In some embodiments, the first microstructures are arranged in a first row and a third row. The second microstructures are arranged in a second row and a fourth row. The first row extends in a direction parallel to a first axis. The second row extends in a direction parallel to the first axis. The third row extends in a direction parallel to the first axis. The fourth row extends in a direction parallel to the first axis.

In some embodiments, the first row, the second row, the third row, and the fourth row are arranged in a direction parallel to a second axis. The first axis and the second axis are perpendicular.

In some embodiments, the first microstructures include a first microstructure first unit and a first microstructure second unit. The first microstructure first unit is strip-shaped. The first microstructure second unit is strip-shaped. The first microstructure first unit extends in a direction parallel to a first axis. The first microstructure second unit extends in the direction parallel to the first axis.

In some embodiments, lengths of the first microstructure first unit and the first microstructure second unit are different.

In some embodiments, the second microstructures include a second microstructure first unit and a plurality of second microstructure second units. The second microstructure first unit is disposed between the first microstructure first unit and the first microstructure second unit. The second microstructure second units are arranged along a circle. The second microstructure second units surround the first microstructure first unit.

In some embodiments, the second microstructure second units surround the first microstructure second unit. The second microstructure second units surround the second microstructure first unit. A center of the circle is at the second microstructure first unit.

In some embodiments, the first optical assembly includes a first optical element, a second optical element, and a coupling element. A plurality of first microstructures are formed on the first optical element. A plurality of second microstructures are formed on the second optical element. The first microstructures are used for diffracting the first light. The second microstructures are used for diffracting the second light. The first optical element and the coupling element are arranged along a first axis. The second optical element and the coupling element are arranged along the first axis.

In some embodiments, the light guiding element and the light source assembly are arranged along the first axis. The first microstructures and the second microstructures do not overlap each other along the first axis.

In some embodiments, the coupling element is disposed between the light guiding element and the first optical element. The coupling element is disposed between the light guiding element and the second optical element.

In some embodiments, the light guiding element includes a first surface. The first surface faces the first optical assembly. The first optical assembly further includes a first driving element and a second driving element. The first driving element is used for driving the first optical element to move relative to the light guiding element in directions parallel to the first surface. The second driving element is used for driving the second optical element to move relative to the light guiding element in directions parallel to the first surface.

In some embodiments, the first axis and the first surface are perpendicular.

In some embodiments, the first optical element is disposed between the light guiding element and the coupling element. The second optical element is disposed between the light guiding element and the coupling element.

In some embodiments, the first optical element is disposed between the second optical element and the coupling element.

In some embodiments, the first optical element and the second optical element are arranged along a second axis. The first axis and the second axis are perpendicular. The first optical element and the second optical element are separated from each other.

In some embodiments, the coupling element includes a first coupling unit and a second coupling unit. The first coupling unit is disposed on the first optical element. The second coupling unit is disposed on the second optical element. The first coupling unit and the second coupling unit are separated from each other.

In some embodiments, the optical system further includes a second optical assembly, an intermediate optical assembly, and a sensing element. The light guiding element includes a first surface. The first optical assembly, the second optical assembly, and the intermediate optical assembly are disposed on the first surface.

In some embodiments, the first surface and a first axis are perpendicular. The second optical assembly and the intermediate optical assembly are arranged along a second axis. The first optical assembly and the intermediate optical assembly are arranged along a third axis. The first axis and the second axis are perpendicular. The first axis and the third axis are perpendicular. The second axis and the third axis are not parallel.

In some embodiments, the first light sequentially passes through the first optical assembly, the intermediate optical assembly, and the second optical assembly to reach an eye. The second light sequentially passes through the first optical assembly and the second optical assembly to reach the eye. The second light does not pass through the intermediate optical assembly.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
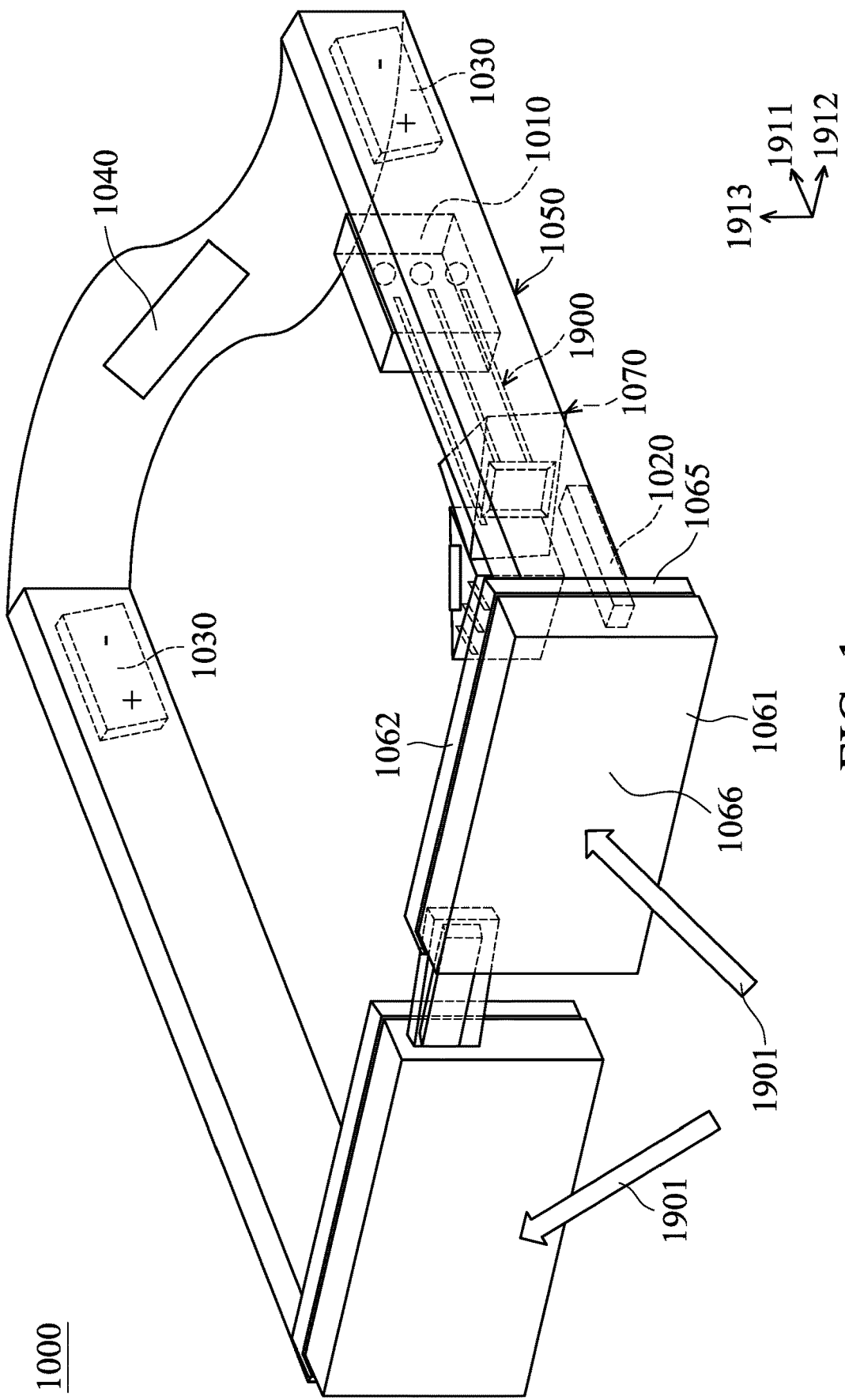
FIG. 1 is a schematic view of an optical system in some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Embodiments of the present disclosure provides an optical system, especially an optical system having augmented reality (AR), virtual reality (VR), or mixed reality (MR) functions. For example, FIG. 1 is a schematic view of an optical system 1000 in some embodiments of the present disclosure. As shown in FIG. 1, the optical system 1000 may include a frame 1010 (fixed portion) and elements disposed on the frame 1010, such as a control element 1020, a energy storage element 1030, a memory element 1040, a light source assembly 1050, a lens 1061, a light guiding element 1062, and a light path adjusting assembly 1070.

In some embodiments, the control element 1020 may be used for processing signals of the optical system 1000 and may electrically connect to the energy storage element 1030, the memory element 1040, the light source assembly 1050, and the light path adjusting assembly 1070, etc. The control element 1020 may include general processor, chip multiprocessor (CMP), dedicated processor, embedded processor, digital signal processor (DSP), network processor, input/output (I/O) processor, media access control (MAC) processor, radio baseband processor, co-processor, such as complex instruction set computer (CISC) microprocessor, reduced instruction set computing (RISC) microprocessor, and/or very long instruction word (VLIW) microprocessor, or other processing devices for microprocessors. Processors may also include controllers, microcontrollers, application-specific integrated circuits (ASIC), field-programmable gate arrays (FPGA), programmable logic devices (PLD), etc.

In some embodiments, the energy storage element 1030 may include batteries (including lithium-ion batteries, such as lithium ternary batteries, lithium manganese batteries, lithium cobalt batteries, lithium iron batteries, etc.), power management chips (such as power management integrated circuit, PMIC chips), etc., to supply the energy required for the operation of various elements in the optical system 1000. In some embodiments, the energy storage element 1030 may be charged through a port (not shown).

In some embodiments, the memory element 1040 may be used to store the information required for the operation of the optical system 1000. In some embodiments, the memory element 1040 may include memory devices such as Dynamic Random Access Memory (DRAM) chips, Static Random Access Memory (SRAM) chips, High Bandwidth Memory (HBM) chips, and the like. In some embodiments, the memory element 1040 may also include hard drives, disks, memory cards, or any other type of media suitable for storing information.

In some embodiments, the light source assembly 1050 may be used to emit light 1900. The light 1900 may, for example, include a virtual image that may be combined with real images to provide an augmented reality experience to the human eye.

In some embodiments, the lens 1061 and the light guiding element 1062 may arrange along a first axis 1911. The light guiding element 1062 may include, for example, waveguide, and may correspond to the light path adjusting assembly 1070, such as the light path adjusting assembly 1070 may be disposed between the light source assembly 1050 and the light guiding element 1062. After the light guiding element 1062 receives the light 1900, the light 1900 is allowed to be transmitted within the light guiding element 1062 to reach the position of the eye 1910 (FIG. 2), and then it leaves the light guiding element 1062 to reach the eye 1910. Therefore, the external light 1901 may penetrate the lens 1061 and the light guiding element 1062. Therefore, the eye 1910 may receive the light 1900 and the external light 1901 at a same time to achieve augmented reality.

In some embodiments, the light path adjusting assembly 1070 may correspond to the light source assembly 1050 to adjust optical properties of the light emitted by the light source assembly 1050 (such as propagation path, focal length, and other optical characteristics).

Figure 2:
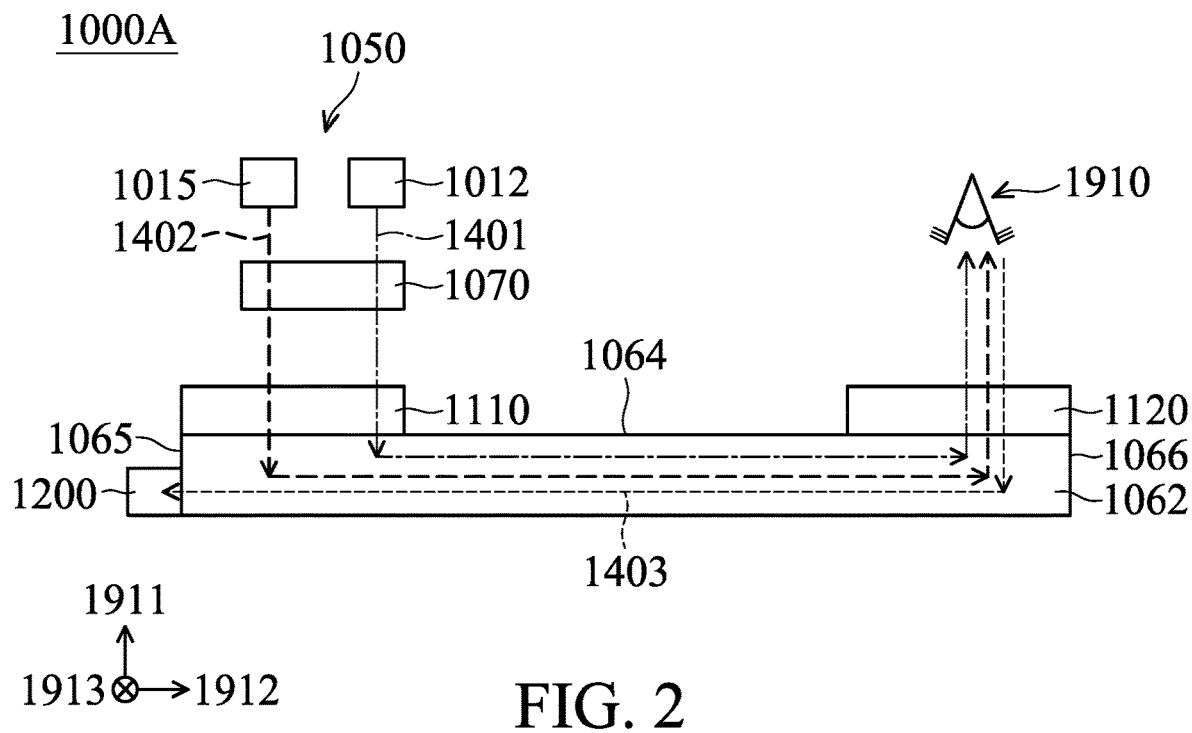
FIG. 2 is a schematic view of an optical system in some embodiments of the present disclosure.

FIG. 2 is a schematic view of an optical system 1000A in some embodiments of the present disclosure. As shown in FIG. 2, the light source assembly 1050 may include a first light source 1012 and a second light source 1015 used for transmitting first light 1401 and second light 1402 (both of them are a portion of the light 1900 in FIG. 1) with different wavelengths. For example, the wavelength of the first light 1401 is visible (about 400 to 700 nm) for providing an image to the eye 1910.

In some embodiments, the optical system 1000A may further include eye-tracking function to track information of the eye 1910, such the position and viewing angle. Afterwards, the first light 1401 is adjusted based on the information, such as the position and size of the images viewed by the eye 1910. To achieve eye-tracking, the second light 1402 may have a wavelength of infrared light, and after the second light 1402 reaches the eye 1910, it will be reflected by the eye 1910 to be third light 1403. The third light 1403 may include information of the eye 1910 such as the position and the viewing angle. Finally, such information is received by the sensing element 1200. Therefore, eye-tracking may be achieved.

In some embodiments, a first optical assembly 1110 and the second optical assembly 1120 may be disposed on a first surface 1064 of the light guiding element 1062 to change properties of the light passed through, such as change its direction. The first light 1401 and the second light 1402 may sequentially pass through the light path adjusting assembly 1070, the first optical assembly 1110, the light guiding element 1062, and the second optical assembly 1120 to reach the eye 1910. In some embodiments, the first surface 1064 may be perpendicular to the first axis 1911 and may face the eye 1910.

In some embodiments, the light guiding element 1062 may further include a first side 1065 and a second side 1066 adjacent to the first surface 1064 and face different directions to the first surface 1064 (such as the first surface 1064 is perpendicular to the first side 1065 and the second side 1066). The sensing element 1200 may be disposed on the first side 1065, such as the sensing element 1200 and the light guiding element 1062 may arrange along a second axis 1912, and the second axis 1912 may be perpendicular to the first axis 1911. After the second light 1402 reaches the eye 1910 and is reflected into the third light 1403, the second light 1402 may sequentially pass through the second optical assembly 1120 and the first surface 1064 of the light guiding element 1062, and then leaves the light guiding element 1062 from the first side 1065 to reach the sensing element 1200. Since the light source assembly 1050 and the sensing element 1200 are disposed on different sides of the light guiding element 1062, interference between the lights may be reduced to achieve better sensing performance.

It should be noted that the paths of the lights in the drawings are only schematic. In fact, the light will be deflected at the first optical assembly 1110 and the second optical assembly 1120 and transmitted between the surfaces of the light guiding element 1062 by total reflection. In the drawings, for the sake of simplicity, only the relationship between the light and the elements it passes through is roughly illustrated.

Figure 3:
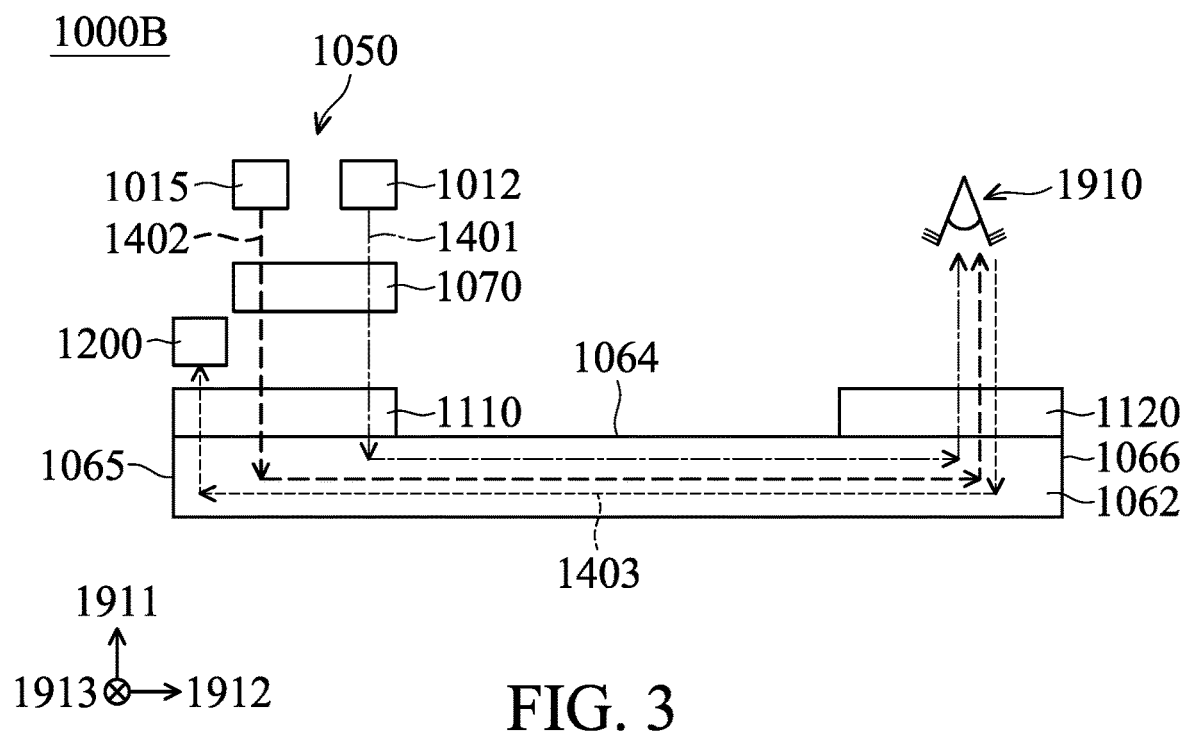
FIG. 3 is a schematic view of an optical system in some embodiments of the present disclosure.

However, the present disclosure is not limited thereto. For example, FIG. 3 is a schematic view of an optical system 1000B in some embodiments of the present disclosure, and elements similar to aforementioned embodiments are not described again. In some embodiments, the sensing element 1200 of the optical system 1000B is disposed on a side that the first surface 1064 facing, such as the sensing element 1200 and the light source assembly 1050 are disposed on an identical side of the first surface 1064. Therefore, the size of the optical system 1000B in the second axis 1912 may be reduced to achieve miniaturization. In some embodiments, the third light 1403 may pass through the first optical assembly 1110 to reach the sensing element 1200.

Figure 4:
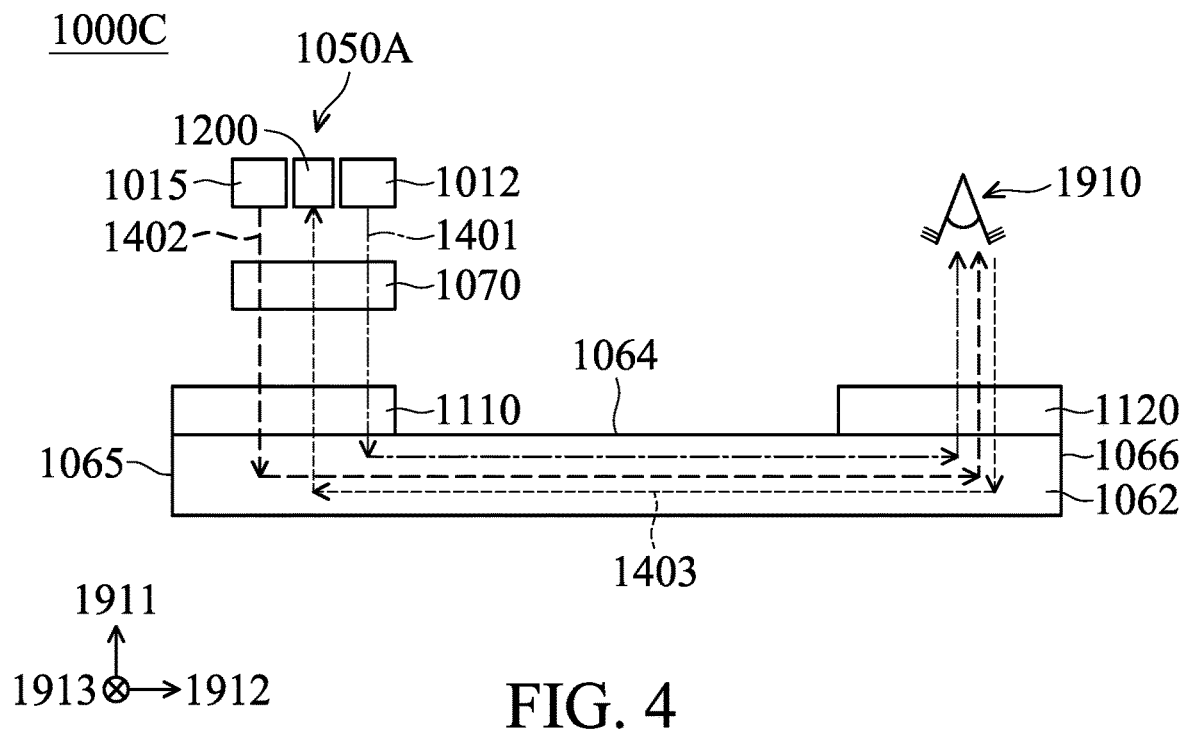
FIG. 4 is a schematic view of an optical system in some embodiments of the present disclosure.

FIG. 4 is a schematic view of an optical system 1000C in some embodiments of the present disclosure, and elements similar to aforementioned embodiments are not described again. As shown in FIG. 4, the sensing element 1200 of the optical system 1000C may be disposed between the first light source 1012 and the second light source 1015, and the first light source 1012, the second light source 1015, and the sensing element 1200 may be called as a light source assembly 1050A. Therefore, the size of the optical system 1000C may be further reduced to achieve miniaturization.

Figure 5A:
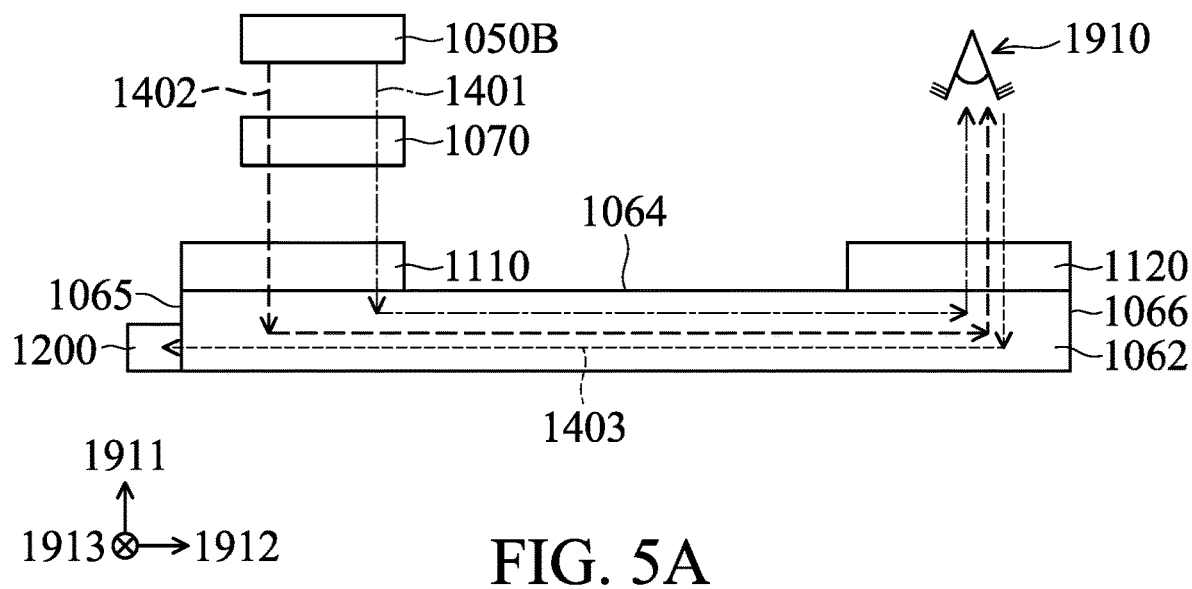
FIG. 5A is a schematic view of an optical system in some embodiments of the present disclosure.
Figure 5B:
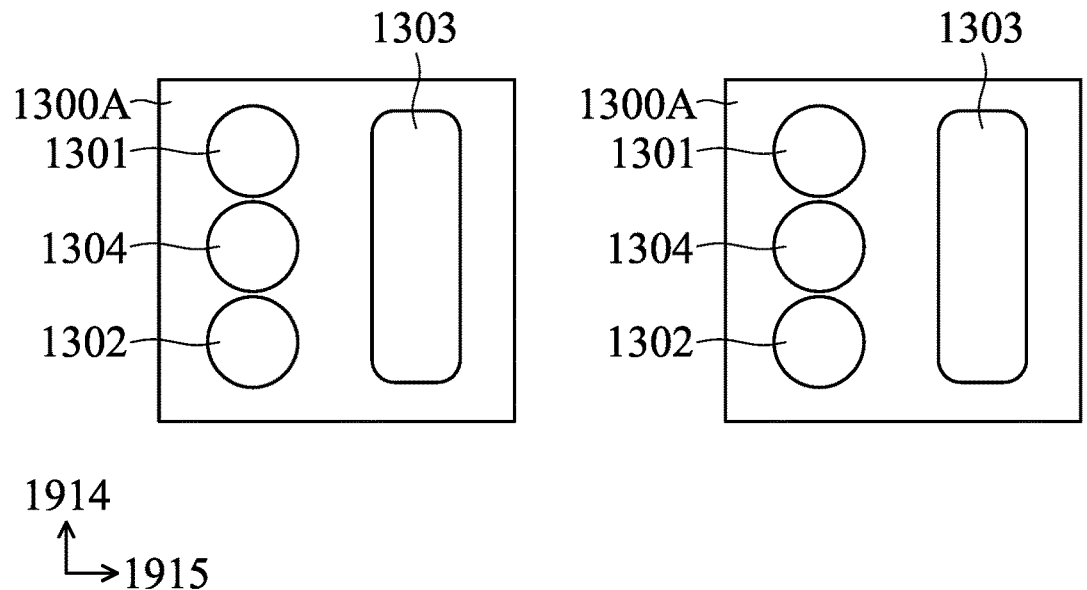
FIG. 5B is a schematic view of the light source assembly.

FIG. 5A is a schematic view of an optical system 1000D in some embodiments of the present disclosure, and elements similar to aforementioned embodiments are not described again. The first light source 1012 and the second light source 1015 of the optical system 1000D may be combined as a light source assembly 1050B. FIG. 5B is a schematic view of the light source assembly 1050B. As shown in FIG. 5B, the light source assembly 1050D may include a plurality of light source units 1300A, and each of the light source unit 1300A may include a first light-emitting unit 1301, a second light-emitting unit 1302, a third light-emitting unit 1303, and a fourth light-emitting unit 1304.

In some embodiments, the first light-emitting unit 1301, the second light-emitting unit 1302, the third light-emitting unit 1303, and the fourth light-emitting unit 1304 may be used for generating lights with different wavelengths, such as the first light-emitting unit 1301, the second light-emitting unit 1302, and the third light-emitting unit 1303 may be used for generating red, blue, and green lights, respectively (all of them are portions of the first light 1401), and the fourth light-emitting unit 1304 may be used for generating the second light 1402.

In some embodiments, the first light-emitting unit 1301, the second light-emitting unit 1302, and the fourth light-emitting unit 1304 of the light source unit 1300A may arrange along an axis 1914, and the third light-emitting unit 1303 may be strip-shaped and may arrange along the axis 1914. In some embodiments, the area of the third light-emitting unit 1303 may be greater than the area of the first light-emitting unit 1301, the second light-emitting unit 1302, or the fourth light-emitting unit 1304. The third light-emitting unit 1303 may arrange with the first light-emitting unit 1301, the fourth light-emitting unit 1304, or the second light-emitting unit 1302 along an axis 1915, and the axis 1914 and the axis 1915 may be perpendicular. In some embodiments, the fourth light-emitting unit 1304 may be disposed between the first light-emitting unit 1301 and the second light-emitting unit 1302.

Figure 6A:
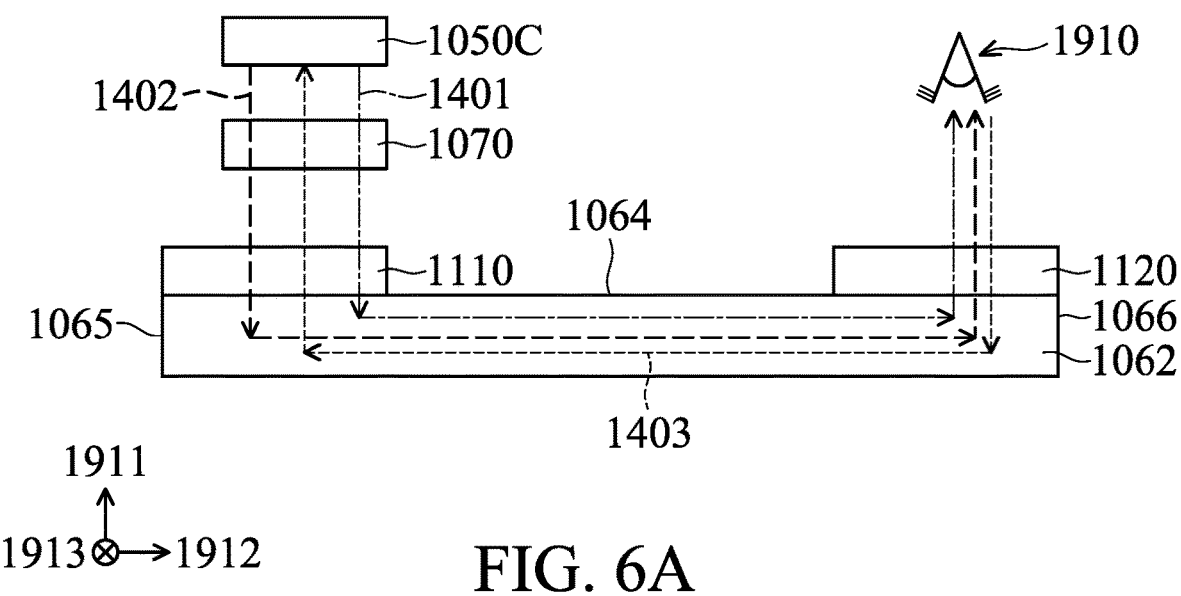
FIG. 6A is a schematic view of an optical system in some embodiments of the present disclosure.
Figure 6B:
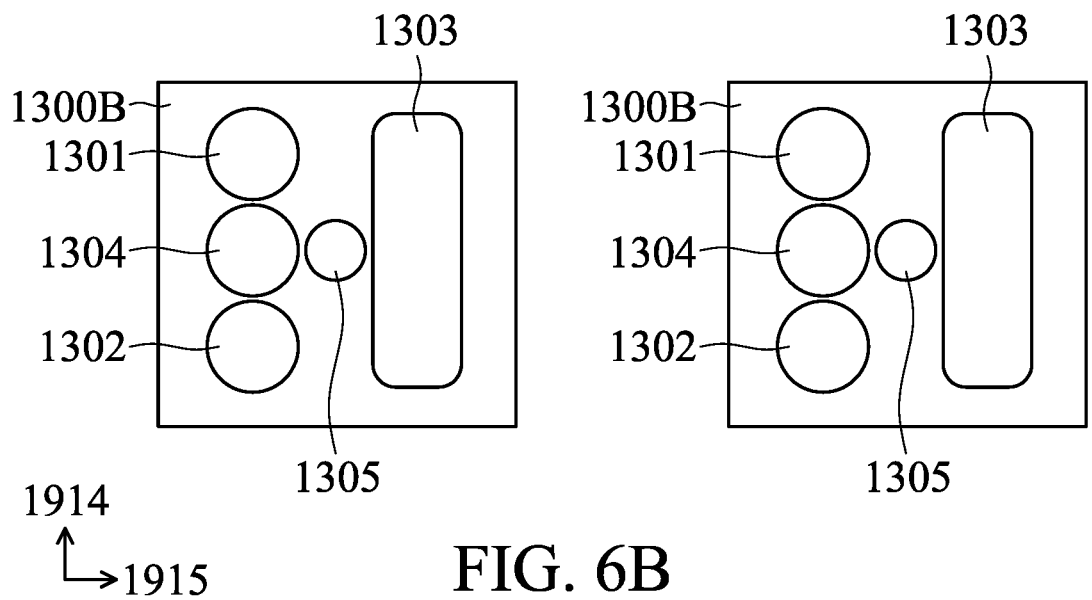
FIG. 6B is a schematic view of the light source assembly.

FIG. 6A is a schematic view of an optical system 1000D in some embodiments of the present disclosure, and elements similar to aforementioned embodiments are not described again. The first light source 1012, the second light source 1015, and the control element 1020 may be combined as a light source assembly 1050C in the optical system 1000E. FIG. 6B is a schematic view of the light source assembly 1050C. As shown in FIG. 6B, the light source assembly 1050C may include a plurality of light source units 1300B, and each of the light source unit 1300B may include a first light-emitting unit 1301, a second light-emitting unit 1302, a third light-emitting unit 1303, a fourth light-emitting unit 1304, and a sensing element 1305.

In some embodiments, the first light-emitting unit 1301, the second light-emitting unit 1302, and the fourth light-emitting unit 1304 of the light source unit 1300B may arrange along an axis 1914, and the third light-emitting unit 1303 may be strip-shaped and may arrange along the axis 1914. In some embodiments, the area of the third light-emitting unit 1303 may be greater than the area of the first light-emitting unit 1301, the second light-emitting unit 1302, or the fourth light-emitting unit 1304. The third light-emitting unit 1303 may arrange with the first light-emitting unit 1301, the fourth light-emitting unit 1304, or the second light-emitting unit 1302 along an axis 1915, and the axis 1914 and the axis 1915 may be perpendicular. In some embodiments, the fourth light-emitting unit 1304 may be disposed between the first light-emitting unit 1301 and the second light-emitting unit 1302.

In some embodiments, the sensing element 1305 may be disposed between the third light-emitting unit 1303 and the first light-emitting unit 1301, the fourth light-emitting unit 1304, or the second light-emitting unit 1302. In some embodiments, the fourth light-emitting unit 1304, the sensing element 1305, and the third light-emitting unit 1303 are arranged along the axis 1915. In some embodiments, the area of the sensing element 1305 may be less than the area of the first light-emitting unit 1301, the second light-emitting unit 1302, the third light-emitting unit 1303, or the fourth light-emitting unit 1304. In some embodiments, the first surface 1064 may face the sensing element 1305. In some embodiments, the axis that the sensing element 1305 and the first light-emitting unit 1301 are arranged, the axis that the sensing element 1305 and the second light-emitting unit 1302 are arranged, and the axis that the sensing element 1305 and the fourth light-emitting unit 1304 are arranged may be different.

Since the light units (and sensing unit) are integrated into the light source unit 1300A or the light source unit 1300B, the numbers of the elements in the optical system 1000D or the optical system 1000E may be further reduced to achieve miniaturization.

Figure 7A:
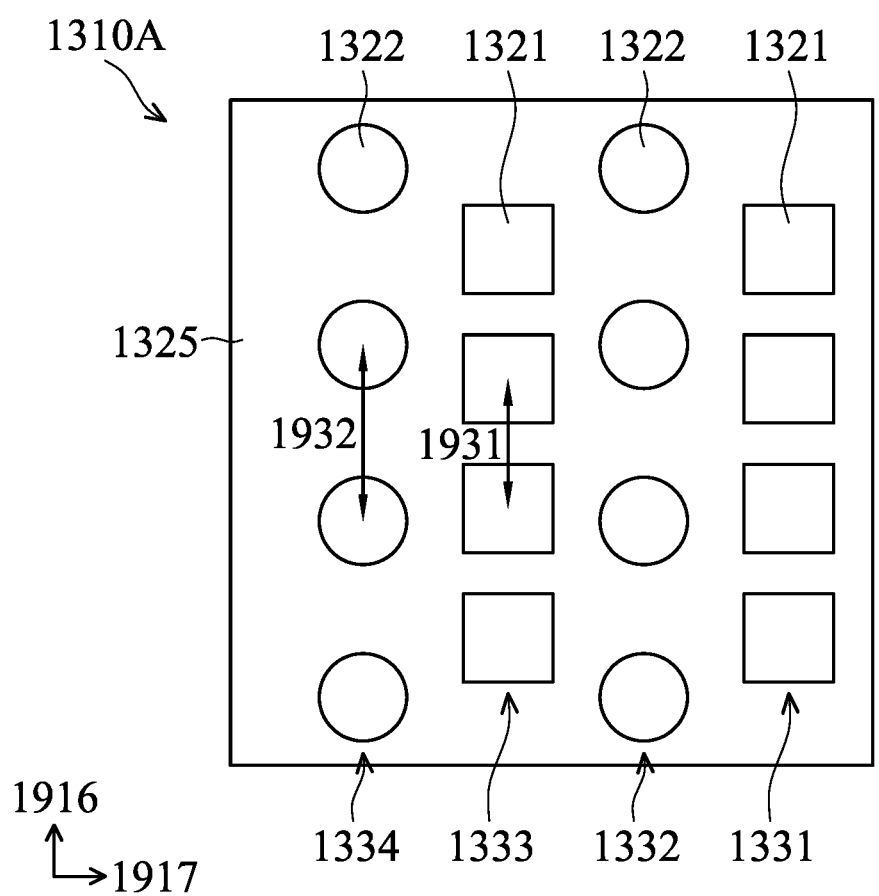
FIG. 7A is a schematic view of a first optical element.

In some embodiments, the first optical assembly 1110 may include a single optical element. For example, FIG. 7A is a schematic view of a first optical element 1310A, which may be a portion of the first optical assembly 1110. As shown in FIG. 7A, the first optical element 1310A may include a substrate 1325 and a plurality of first microstructures 1321 and second microstructures 1322 formed over the substrate 1325. In some embodiments, the first microstructure 1321 may be used to diffract the first light 1401, and the second microstructure 1322 may be used to diffract the second light 1402 to change the directions of the first light 1401 and the second light 1402.

In some embodiments, as shown in FIG. 7A, the first microstructure 1321 and the second microstructure 1322 may arranged as rows and may be staggered. For example, the microstructures on the first optical element 1310A may have a first row 1331, a second row 1332, a third row 1333, and a fourth row 1334 in sequence. The first microstructure 1321 may arrange at the first row 1331 and the third row 1333, and the second microstructure 1322 may arrange at the second row 1332 and the fourth row 1334. In some embodiments, the first row 1331, the second row 1332, the third row 1333, and the fourth row 1334 may extend in a direction perpendicular to a axis 1916. In other words, the first microstructure 1321 may arrange along the axis 1916, and the second microstructure 1322 may arrange along the axis 1916. The first microstructure 1321 and the second microstructure 1322 may arrange along a axis 1917 perpendicular to the axis 1916. In other words, the first row 1331, the second row 1332, the third row 1333, and the fourth row 1334 may arrange along the axis 1917. In some embodiments, the first microstructure 1321 and the second microstructure 1322 may be columns, and the thicknesses of the first microstructure 1321 and the second microstructure 1322 may be less than 1% of the thickness of the substrate 1325B to reduce the thickness of the whole structure to achieve miniaturization.

In some embodiments, the first microstructure 1321 and the second microstructure 1322 may have different periods to match the first light 1401 and the second light 1402 with different wavelengths. For example, the first microstructure 1321 may have a first gap 1931 and the second microstructure 1322 may have a second gap 1932 in a direction that the axis 1916 extends, and the first gap 1931 and the second gap 1932 are different. For example, the first gap 1931 may be less than the second gap 1932. In some embodiments, the gap between the first row 1331 and the third row 1333 may be different from the gap between the second row 1332 and the fourth row 1334.

Figure 7B:
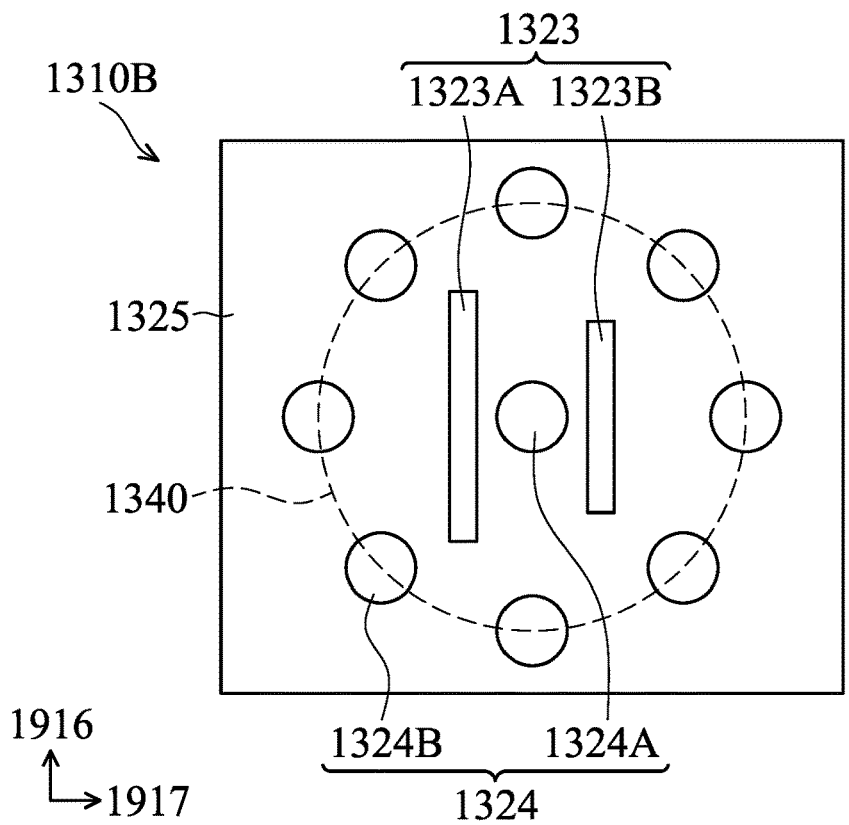
FIG. 7B is a schematic view of a first optical element.

Although the microstructures in the aforementioned embodiment are shown as rows and columns, the present disclosure is not limited thereto. For example, FIG. 7B is a schematic view of a first optical element 1310B. As shown in FIG. 7B, a first microstructure 1323 (including a first microstructure first unit 1323A and first microstructure second unit 1323B) and a second microstructure 1324 (including a second microstructure first unit 1324A and a plurality of second microstructure second units 1324B) are formed on the substrate 1325.

In some embodiments, the first microstructure first unit 1323A and the first microstructure second unit 1323B may be strip-shaped and may arrange along the axis 1916. In some embodiments, the first microstructure first unit 1323A and the first microstructure second unit 1323B may have different lengths, such the length of the first microstructure first unit 1323A may be greater than the length of the first microstructure second unit 1323B.

In some embodiments, the second microstructure second unit 1324B may arrange along a virtual circle 1340, and the second microstructure first unit 1324A may be positioned at the center of the circle 1340. Other units may be provided in the second microstructure 1324, and the units may arrange arranged concentrically with the second microstructure second unit 1324B. In some embodiments, the second microstructure first unit 1324A is disposed between the first microstructure first unit 1323A and the first microstructure second unit 1323B. In some embodiments, the first microstructure first unit 1323A, the first microstructure second unit 1323B, and the second microstructure first unit 1324A are surrounded by the second microstructure second unit 1324B.

Figure 8A:
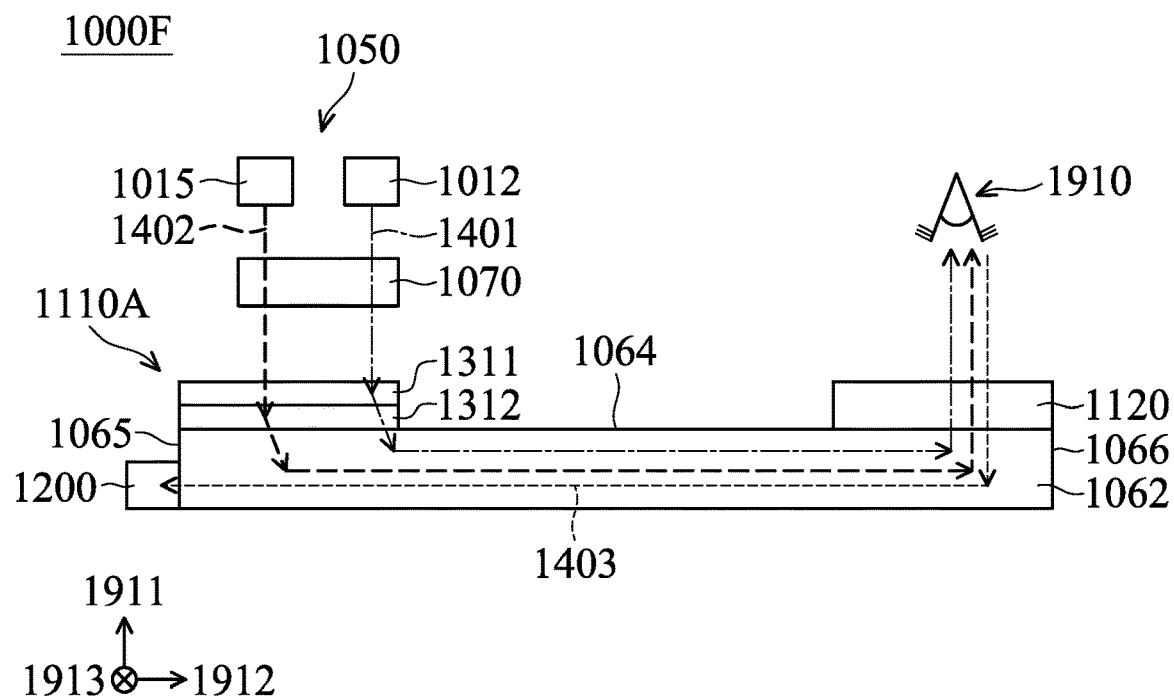
FIG. 8A is a schematic view of an optical system in some embodiments of the present disclosure.

Although the first microstructure and the second microstructure corresponded to the first light 1401 and the second light 1402 are designed on an identical optical element, the present disclosure is not limited thereto. For example, FIG. 8A is a schematic view of an optical system 1000F in some embodiments of the present disclosure, and elements similar to aforementioned embodiments are not described again. As shown in FIG. 8A, the first optical assembly 1110A may include a first optical element 1311 and a second optical element 1312 arrange along the first axis 1911. In some embodiments, the first optical element 1311 may be used for changing the direction of the first light 1401, and the second optical element 1312 may be used for changing the direction of the second light 1402. It should be noted that the directions of the light in FIG. 8A is only schematic. In fact, after light enters the light guiding element 1062, it will be totally reflected between the surfaces, and enter and leave the light guiding element 1062 at the first optical assembly 1110A and the second optical assembly 1120.

Figure 8B:
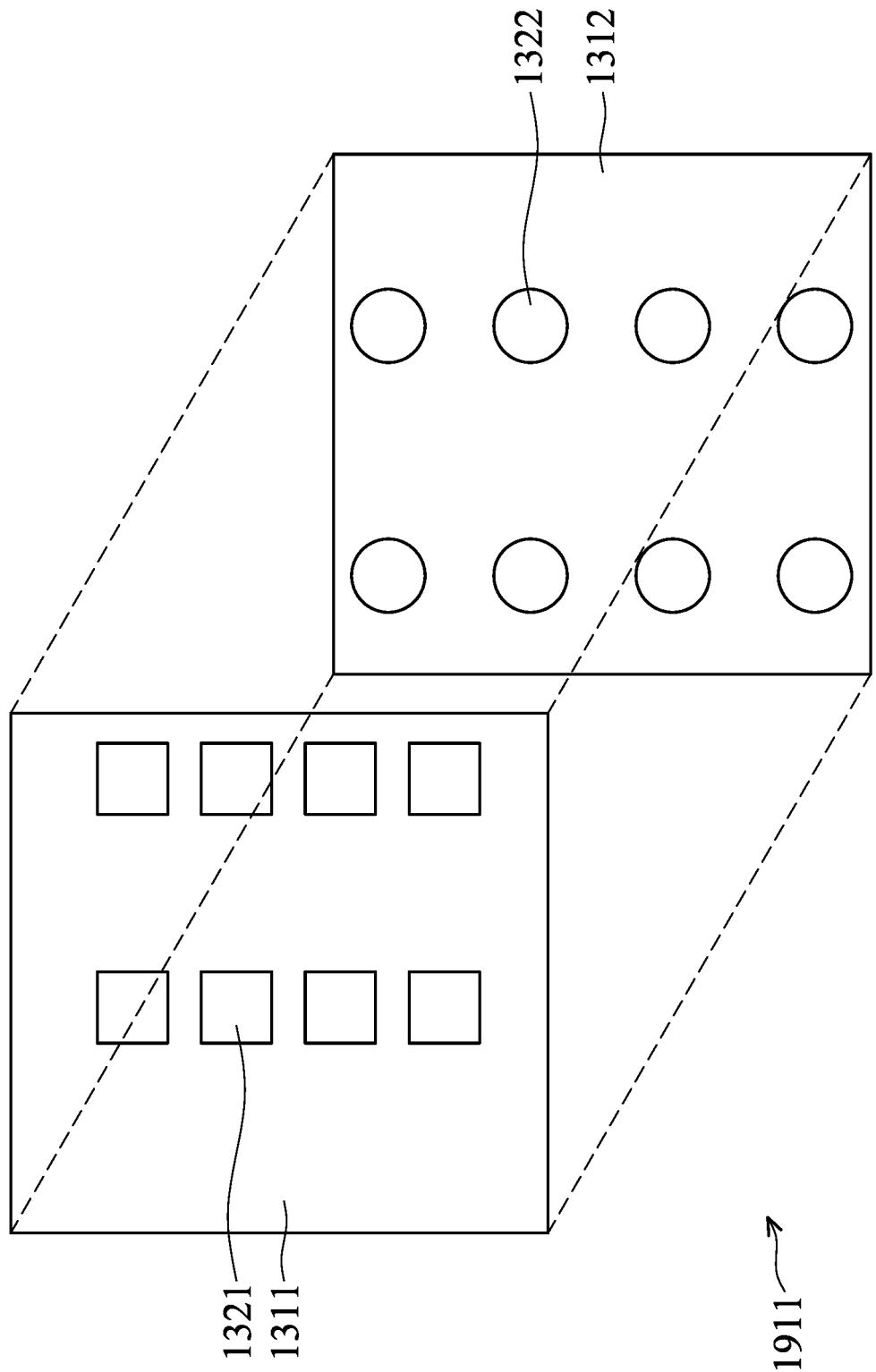
FIG. 8B is a schematic view of the first optical element and the second optical element.

It should be noted that when the first light 1401 enters the first optical element 1311, its direction will be changed. When the first light 1401 enters the second optical element 1312, its direction will not be changed. When the second light 1402 enters the first optical element 1311, its direction will not be changed. When the second light 1402 enters the second optical element 1312, its direction will be changed. FIG. 8B is a schematic view of the first optical element 1311 and the second optical element 1312. As shown in FIG. 8B, first microstructure 1321 may be formed on the first optical element 1311, and second optical element 1312 may be formed on the second microstructure 1322. The first microstructure 1321 and the second microstructure 1322 do not overlap each other in the direction that the first axis 1911 extends.

Figure 9A:
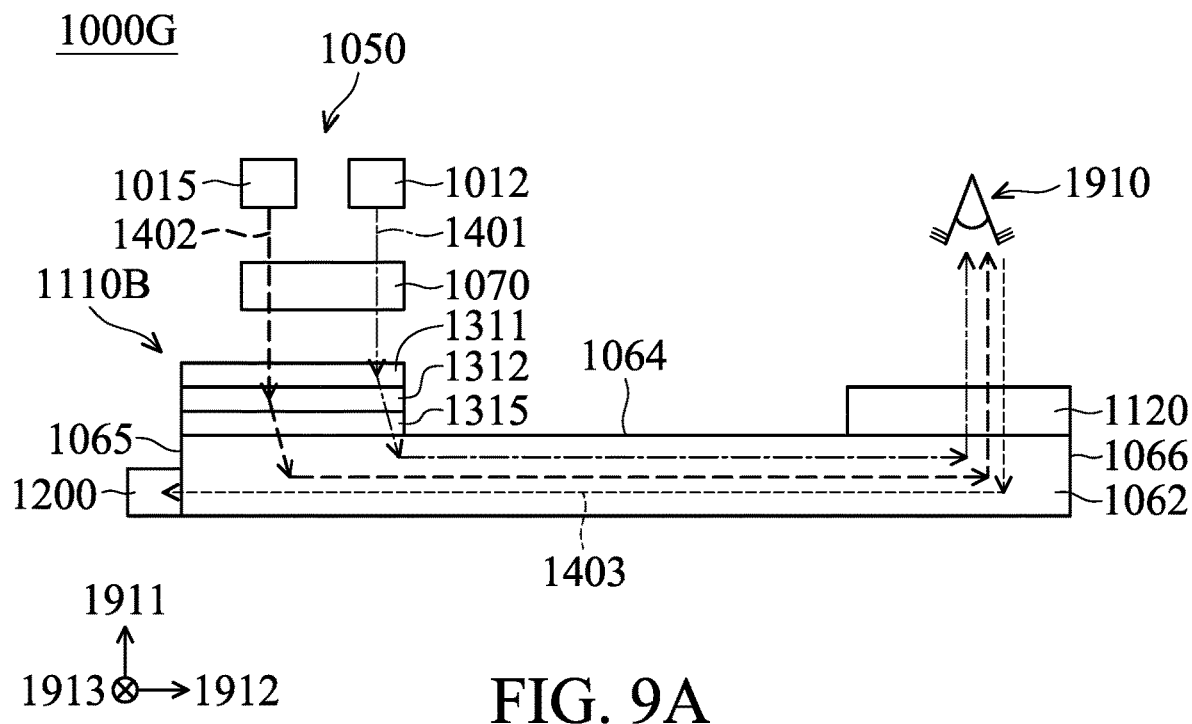
FIG. 9A is a schematic view of an optical system in some embodiments of the present disclosure.

In some embodiments, additional coupling elements may be added in the optical assembly to allow the light coupled into the light guiding element 1062 more easily. For example, FIG. 9A is a schematic view of an optical system 1000G in some embodiments of the present disclosure, and elements similar to aforementioned embodiments are not described again. As shown in FIG. 9A, besides the first optical element 1311 and the second optical element 1312, the first optical assembly 1110B may further include a coupling element 1315. In some embodiments, the coupling element 1315 may be disposed between the first optical element 1311 and the light guiding element 1062, or disposed between the second optical element 1312 and the light guiding element 1062, and may be disposed on the first surface 1064. In some embodiments, the second optical element 1312 may be disposed between the first optical element 1311 and the coupling element 1315. In some embodiments, the first optical element 1311, the second optical element 1312, the coupling element 1315, the light guiding element 1062, and the light source assembly 1050 may arrange along the first axis 1911.

Figure 9B:
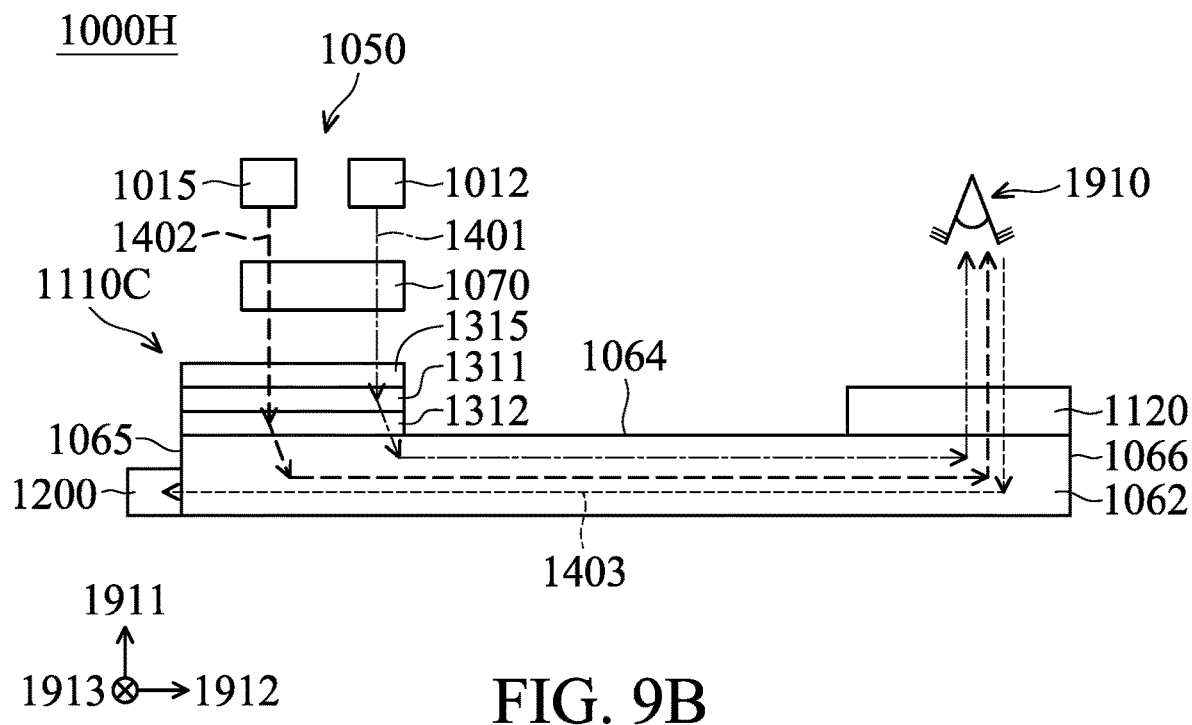
FIG. 9B is a schematic view of an optical system in some embodiments of the present disclosure.

Although the coupling element 1315 is disposed on the first surface 1064, the present disclosure is not limited thereto. For example, FIG. 9B is a schematic view of an optical system 1000H in some embodiments of the present disclosure, and elements similar to aforementioned embodiments are not described again. As shown in FIG. 9B, besides the first optical element 1311 and the second optical element 1312, the first optical assembly 1110C of the optical system 1000B may further a coupling element 1315. In some embodiments, the first optical element 1311 and the second optical element 1312 may be disposed between the coupling element 1315 and the light guiding element 1062. In some embodiments, the first optical element 1311 may be disposed between the second optical element 1312 and the coupling element 1315. In some embodiments, the coupling element 1315 may be separated from the first surface 1064, such as separated by the first optical element 1311 and the second optical element 1312.

Figure 10:
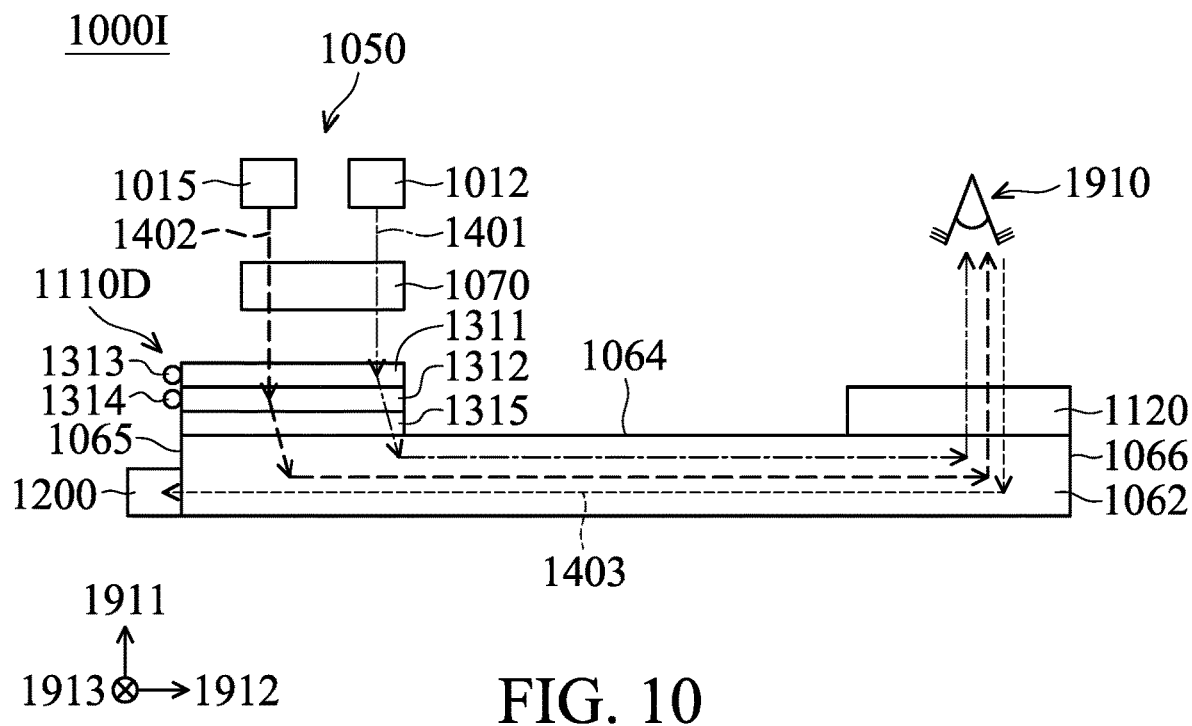
FIG. 10 is a schematic view of an optical system in some embodiments of the present disclosure.

In some embodiments, additional driving elements may be provided to move the first optical element 1311 and the second optical element 1312. For example, FIG. 10 is a schematic view of an optical system 1000I in some embodiments of the present disclosure, and elements similar to aforementioned embodiments are not described again. As shown in FIG. 10, the first optical assembly 1110D may further include a first driving element 1313 and a second driving element 1314 disposed on the first optical element 1311 and the second optical element 1312, respectively. The first driving element 1313 and the second driving element 1314 may be used for driving the first optical element 1311 and the second optical element 1312 to move relative to the light guiding element 1062, respectively. In some embodiments, the movement direction of the first optical element 1311 and the second optical element 1312 may be perpendicular to the first axis 1911. In some embodiments, the first driving element 1313 and the second driving element 1314 may include driving elements such as magnets and coils, piezoelectric elements, shape memory alloys, etc.

Figure 11A:
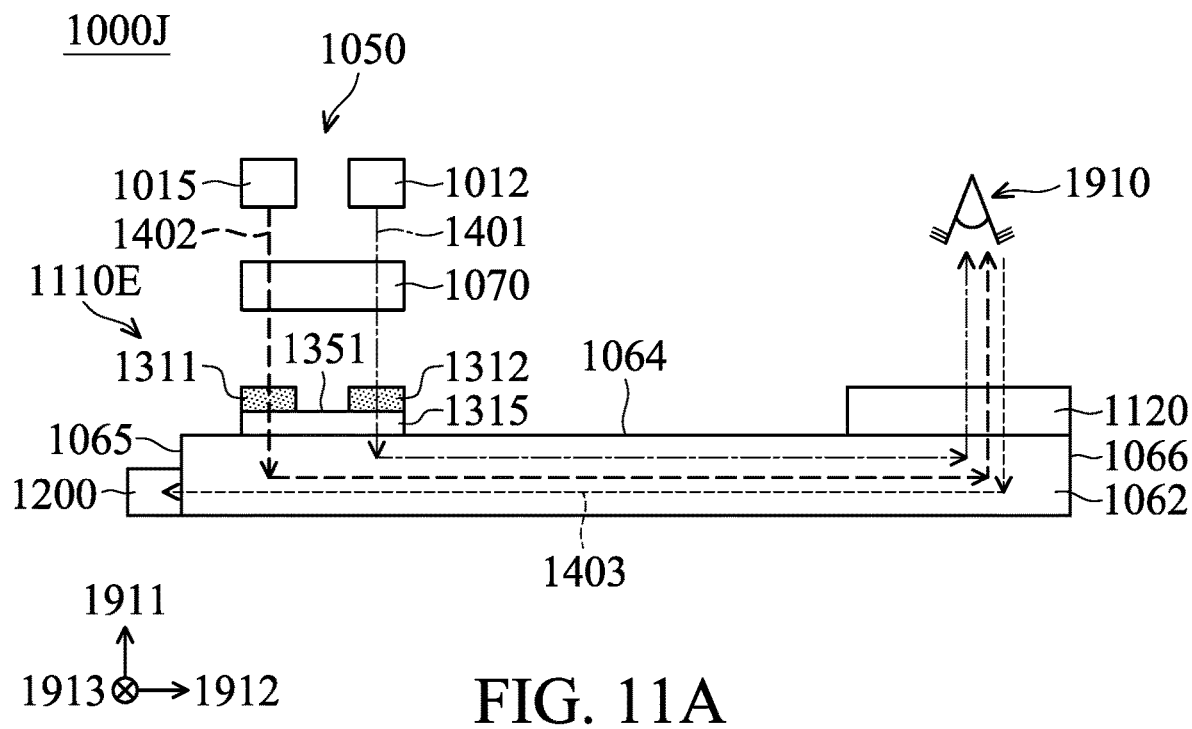
FIG. 11A is a schematic view of an optical system in some embodiments of the present disclosure.

Although the first optical element 1311 and the second optical element 1312 overlap each other in the aforementioned embodiments, the present disclosure is not limited thereto. For example, FIG. 11A is a schematic view of an optical system 1000J in some embodiments of the present disclosure, and elements similar to aforementioned embodiments are not described again. As shown in FIG. 11A, the first optical element 1311 and the second optical element 1312 of the first optical assembly 1110E may be separated from each other and may be disposed on an identical surface of the coupling element 1315, such as a surface 1351 facing away from the light guiding element 1062. In some embodiments, the first optical element 1311 and the second optical element 1312 may at least partially overlap in a direction perpendicular to the first axis 1911 (such as a direction that the second axis 1912 extends) to reduce the size of the first optical assembly 1110E on the first axis 1911 to achieve miniaturization.

Figure 11B:
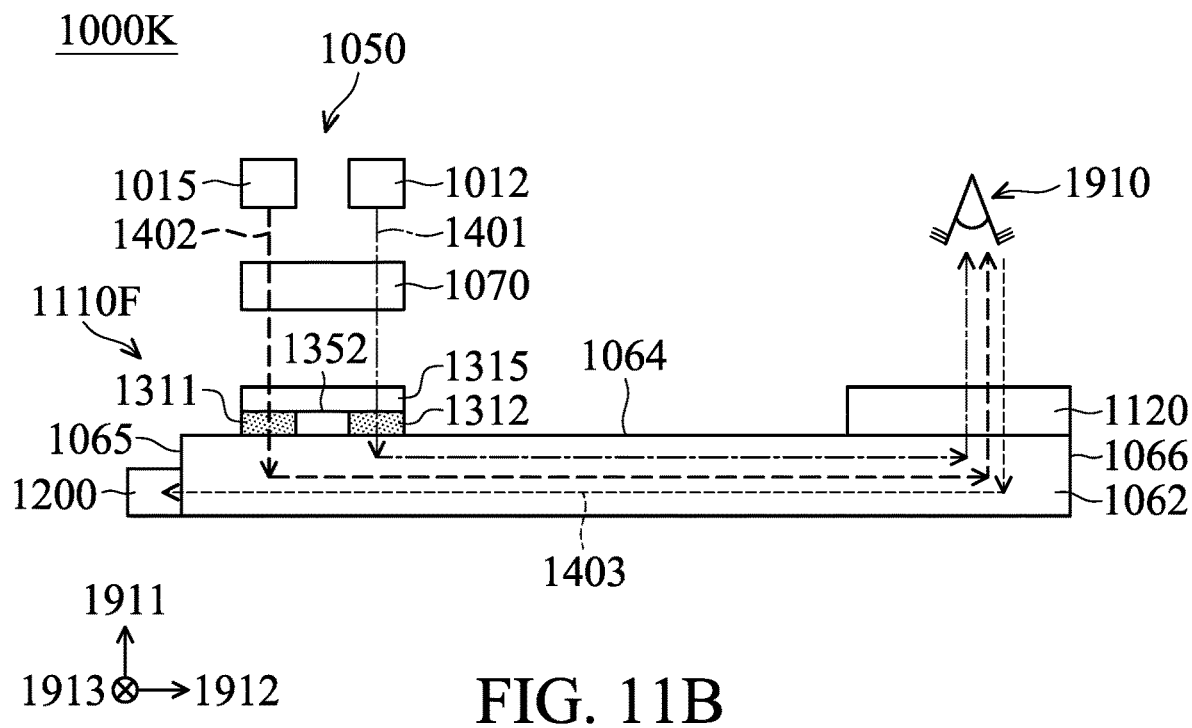
FIG. 11B is a schematic view of an optical system in some embodiments of the present disclosure.

In some embodiments, positions of the first optical element 1311, the second optical element 1312, and the coupling element 1315 may be interchanged. For example, FIG. 11B is a schematic view of an optical system 1000K in some embodiments of the present disclosure, and elements similar to aforementioned embodiments are not described again. As shown in FIG. 11B, the first optical element 1311 and the second optical element 1312 of the first optical assembly 1110F may be separated from each other and may be disposed on an identical surface of the coupling element 1315, such as a surface surface 1352 facing the light guiding element 1062. In some embodiments, the first optical element 1311 and the second optical element 1312 may at least partially overlap in a direction perpendicular to the first axis 1911 (such as a direction that the second axis 1912 extends) to reduce the size of the first optical assembly 1110F on the first axis 1911 to achieve miniaturization.

Figure 12A:
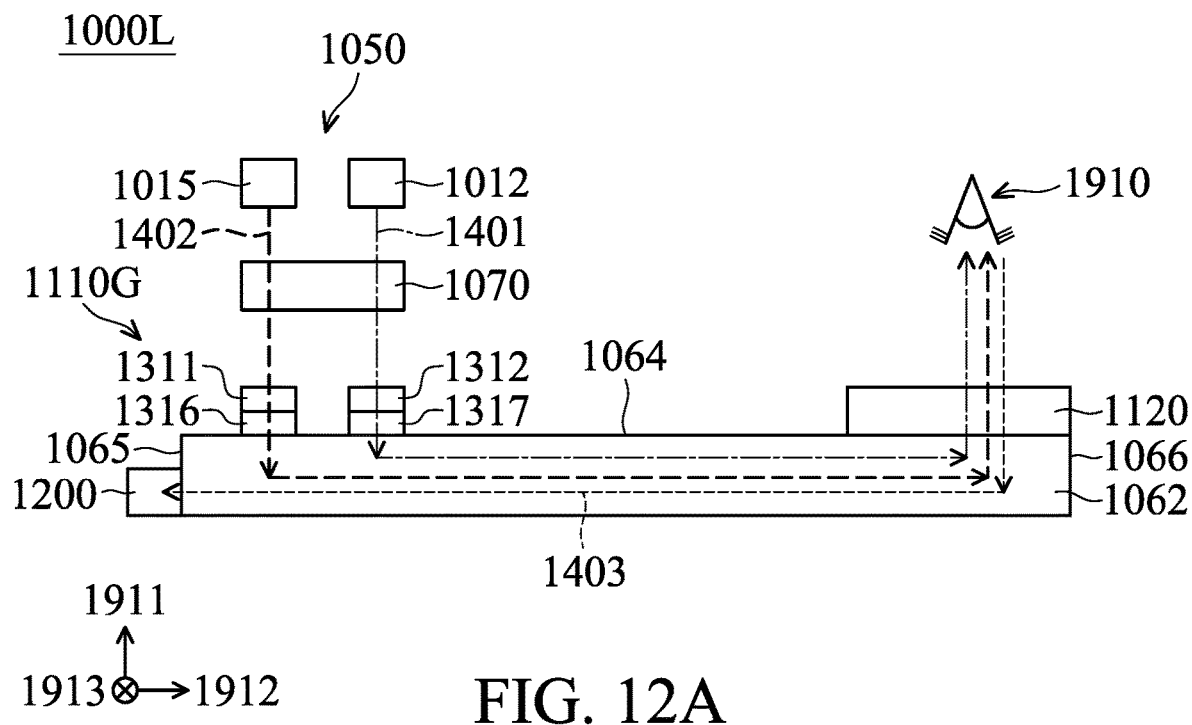
FIG. 12A is a schematic view of an optical system in some embodiments of the present disclosure.

Although the first optical element 1311 and the second optical element 1312 in the aforementioned embodiments correspond to a same coupling element 1315, the present disclosure is not limited thereto. For example, FIG. 12A is a schematic view of an optical system 1000L in some embodiments of the present disclosure, and elements similar to aforementioned embodiments are not described again. As shown in FIG. 12A, the coupling element of the first optical assembly 1110G of the optical system 1000L may include a first coupling unit 1316 and a second coupling unit 1317, and the first optical element 1311 and the second optical element 1312 are disposed on the first coupling unit 1316 and the second coupling unit 1317, respectively. In some embodiments, the first coupling unit 1316 may be disposed between the first optical element 1311 and the light guiding element 1062, the second coupling unit 1317 may be disposed between the second optical element 1312 and the light guiding element 1062, and the first coupling unit 1316 and the second coupling unit 1317 may be separated from each other. In some embodiments, the first coupling unit 1316 and the second coupling unit 1317 may be in direct contact with the first surface 1064. Therefore, different coupling units may be designed for light of different wavelengths to improve coupling efficiency.

Figure 12B:
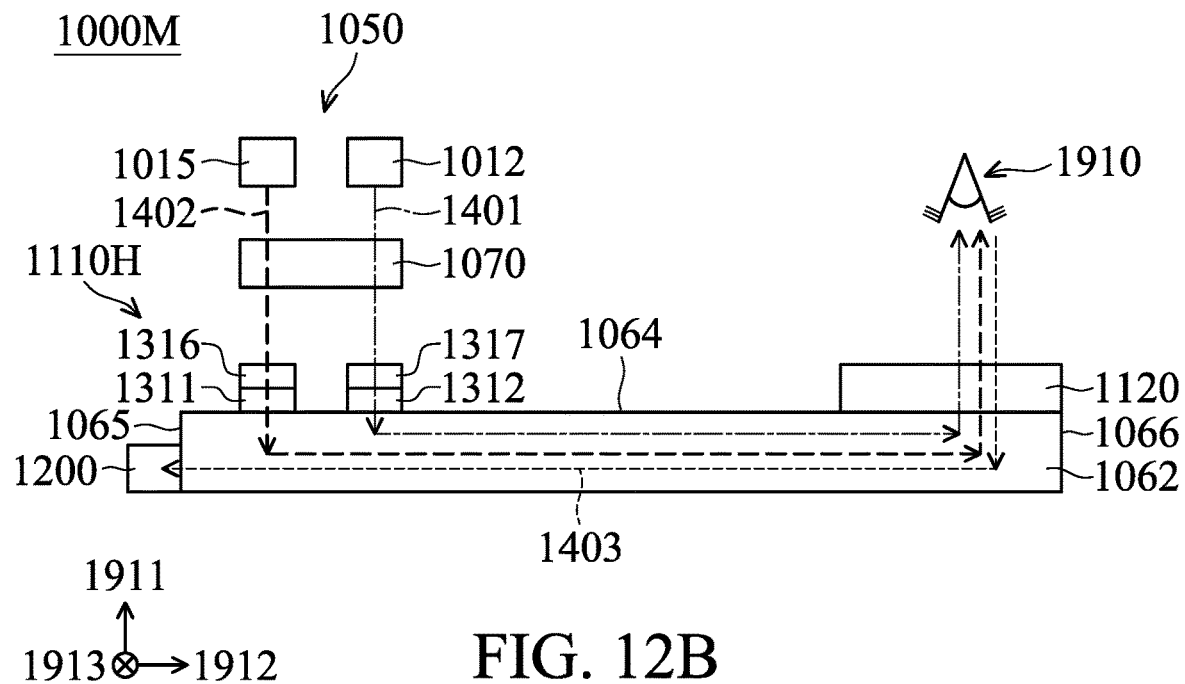
FIG. 12B is a schematic view of an optical system in some embodiments of the present disclosure.

In some embodiments, the positions of the first optical element 1311 and the second optical element 1312 may be interchanged with the first coupling unit 1316 and the second coupling unit 1317. For example, FIG. 12B is a schematic view of an optical system 1000M in some embodiments of the present disclosure, and elements similar to aforementioned embodiments are not described again. As shown in FIG. 12B, the coupling element of the first optical assembly 1110H of the optical system 1000M may include a first coupling unit 1316 and a second coupling unit 1317, and the first optical element 1311 and the second optical element 1312 are disposed on the first coupling unit 1316 and the second coupling unit 1317, respectively. In some embodiments, the first optical element 1311 may be disposed between the first coupling unit 1316 and the light guiding element 1062, the second optical element 1312 may be disposed between the second coupling unit 1317 and the light guiding element 1062, and the first coupling unit 1316 and the second coupling unit 1317 may be separated from each other. In some embodiments, the first optical element 1311 and the second optical element 1312 may be in direct contact with the first surface 1064. Therefore, different coupling units may be designed for light of different wavelengths to improve coupling efficiency.

Figure 13:
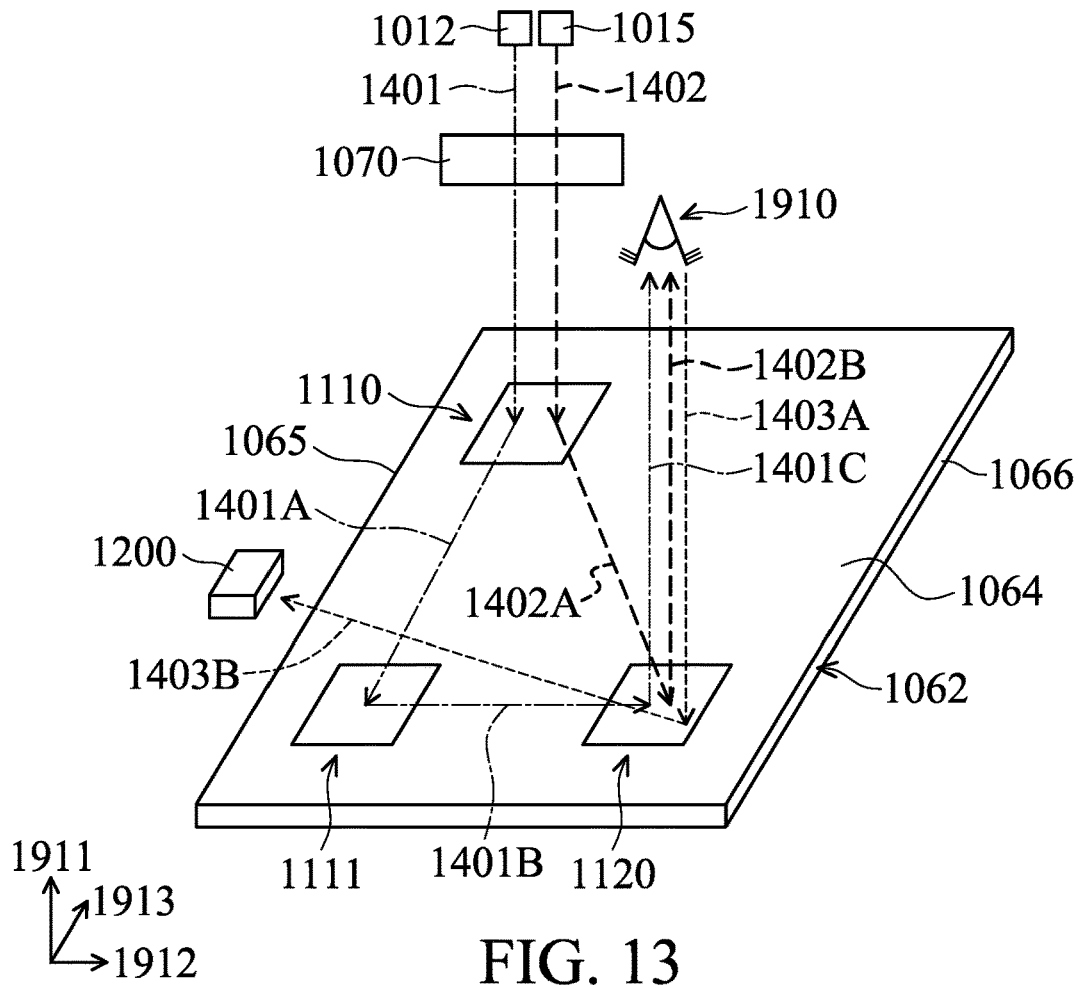
FIG. 13 is a schematic view showing paths of the first light and the second light.

In some embodiments, the first light 1401 and the second light 1402 may have different paths. FIG. 13 is a schematic view showing paths of the first light 1401 and the second light 1402. As shown in FIG. 13, besides the first optical assembly 1110 and the second optical assembly 1120, the light guiding element 1062 may further include a intermediate optical assembly 1111. In some embodiments, the first optical assembly 1110, the second optical assembly 1120, and the intermediate optical assembly 1111 may include aforementioned combinations of substrate and microstructures. In some embodiments, the second optical assembly 1120 and the intermediate optical assembly 1111 may arrange along the second axis 1912, and the first optical assembly 1110 and the intermediate optical assembly 1111 may arrange along the third axis 1913.

In some embodiments, after the first light 1401 reaches the intermediate optical assembly 1111, the direction of the first light 1401 may be changed toward the intermediate optical assembly 1111 (which is indicated by the first light 1401A). After the first light 1401A reaches the intermediate optical assembly 1111, the direction of the first light 1401A changes again (which is indicated by the first light 1401B)

to reach the second optical assembly 1120. Finally, the first light 1401B passes through the second optical assembly 1120 (which is indicated by the first light 1401C) to reach the eye 1910. The beam size of the first light 1401 may be enlarged by passing through the intermediate optical assembly 1111 and reaching the second optical assembly 1120. In some embodiments, the directions of the first light 1401A and the first light 1401B are different, such as the first light 1401A may travel along the third axis 1913, and the first light 1401B may travel along the second axis 1912. The third axis 1913 may be perpendicular to the first axis 1911 and may be not parallel to the second axis 1912. In some embodiments, the third axis 1913 may be perpendicular to the second axis 1912.

In some embodiments, after the second light 1402 reaches the first optical assembly 1110, the second light 1402 may directly travel to the sensing element 1200 (which is indicated by the second light 1402A). Afterwards, the second light 1402A passes through the second optical assembly 1120 to reach the eye 1910 (which is indicated by the second light 1402B). Then the second light 1402A is reflected by the eye 1910 to form a third light 1403A, and then reaches the second optical assembly 1120. Then, the third light 1403A will be changed in direction by the second optical assembly 1120 and reach the sensing element 1200 (which is indicated by the third light 1403B). In some embodiments, the second light 1402 and the third light 1403B do not pass through the intermediate optical assembly 1111. Therefore, the length of the paths of the second light 1402 and the third light 1403B may be reduced to achieve better optical performance.

Figure 14A:
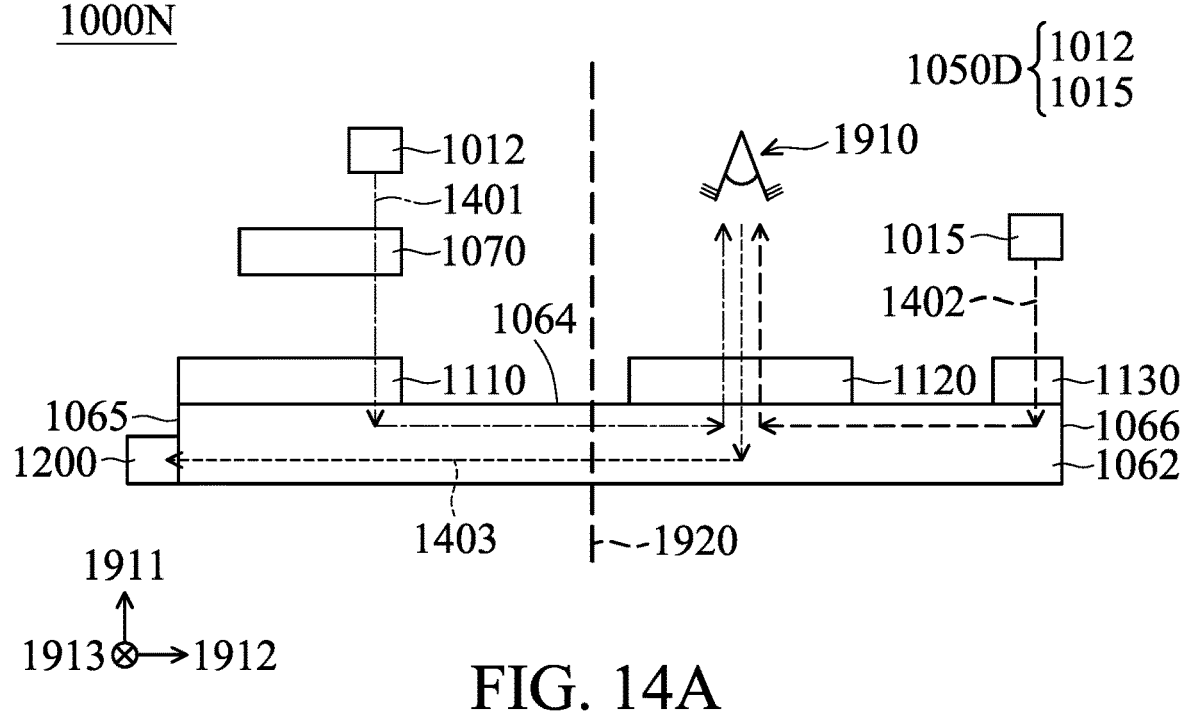
FIG. 14A is a schematic view of an optical system in some embodiments of the present disclosure.

In some embodiments, the first light source 1012 and the second light source 1015 may be disposed on different sides of the optical system. For example, FIG. 14A is a schematic view of an optical system 1000N in some embodiments of the present disclosure, and elements similar to aforementioned embodiments are not described again. As shown in FIG. 14A, a virtual plane 1920 may be defined, and the first light source 1012 and the second light source 1015 of the light source assembly 1050D are positioned on opposite sides of the virtual plane 1920. Moreover, the second light 1402 provided by the second light source 1015 may pass through the third optical assembly 1130 to enter the light guiding element 1062, and then pass through the second optical assembly 1120 to reach the eye 1910. In some embodiments, the first optical assembly 1110 may be adjacent to the first side 1065, and the third optical assembly 1130 may be adjacent to the second side 1066.

In some embodiments, the first optical assembly 1110 and the third optical assembly 1130 may be disposed on opposite sides of the virtual plane 1920. In some embodiments, the sensing element 1200 may be disposed on the first side 1065. In some embodiments, the first optical assembly 1110, the second optical assembly 1120, and the third optical assembly 1130 are separated from each other. In some embodiments, the second optical assembly 1120 may be disposed between the first optical assembly 1110 and the third optical assembly 1130. In some embodiments, the sensing element 1200, the first light source 1012, and the first optical assembly 1110 are disposed on an identical side of the virtual plane 1920. In some embodiments, the sensing element 1200 and the second light source 1015 or the second optical assembly 1120 are disposed on opposite sides of the virtual plane 1920.

Figure 14B:
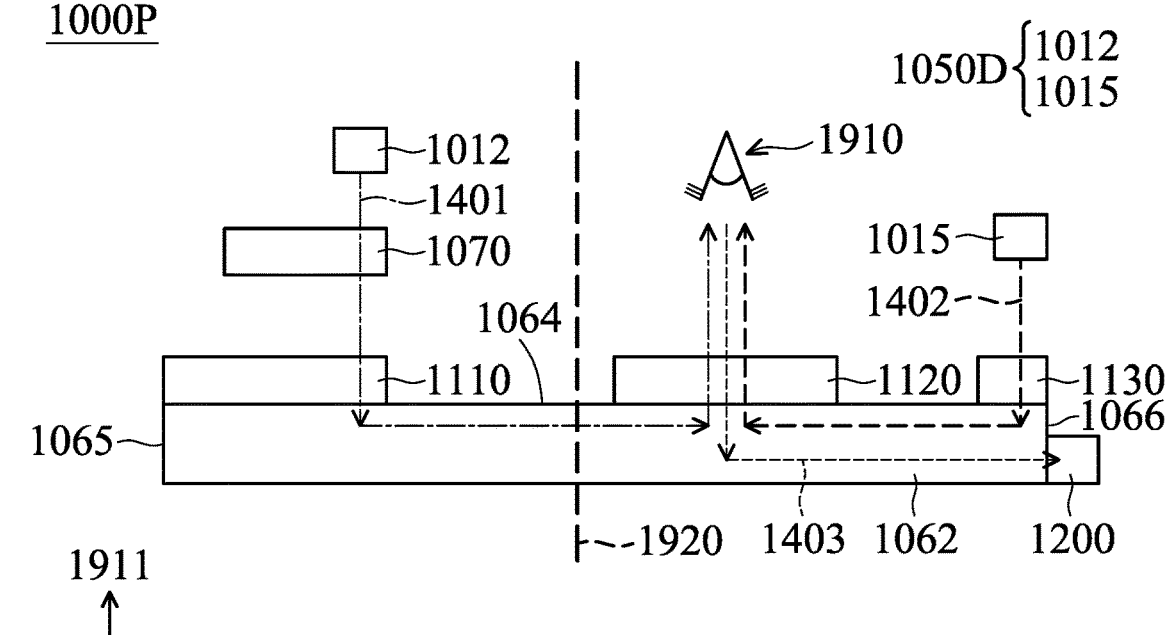
FIG. 14B is a schematic view of an optical system in some embodiments of the present disclosure.

In some embodiments, the position of the sensing element 1200 may be changed. For example, FIG. 14B is a schematic view of an optical system 1000P in some embodiments of the present disclosure, and elements similar to aforementioned embodiments are not described again. As shown in FIG. 14B, the sensing element 1200 of the optical system 1000P may be disposed on the second side 1066. Therefore, the paths of the first light 1401 and the third light 1403 may be substantially separated to prevent interference. In some embodiments, the sensing element 1200 and the first light source 1012 or the first optical assembly 1110 are disposed on opposite sides of the virtual plane 1920. In some embodiments, the sensing element 1200, the second light source 1015, and the second optical assembly 1120 are disposed on an identical side of the virtual plane 1920.

Figure 14C:
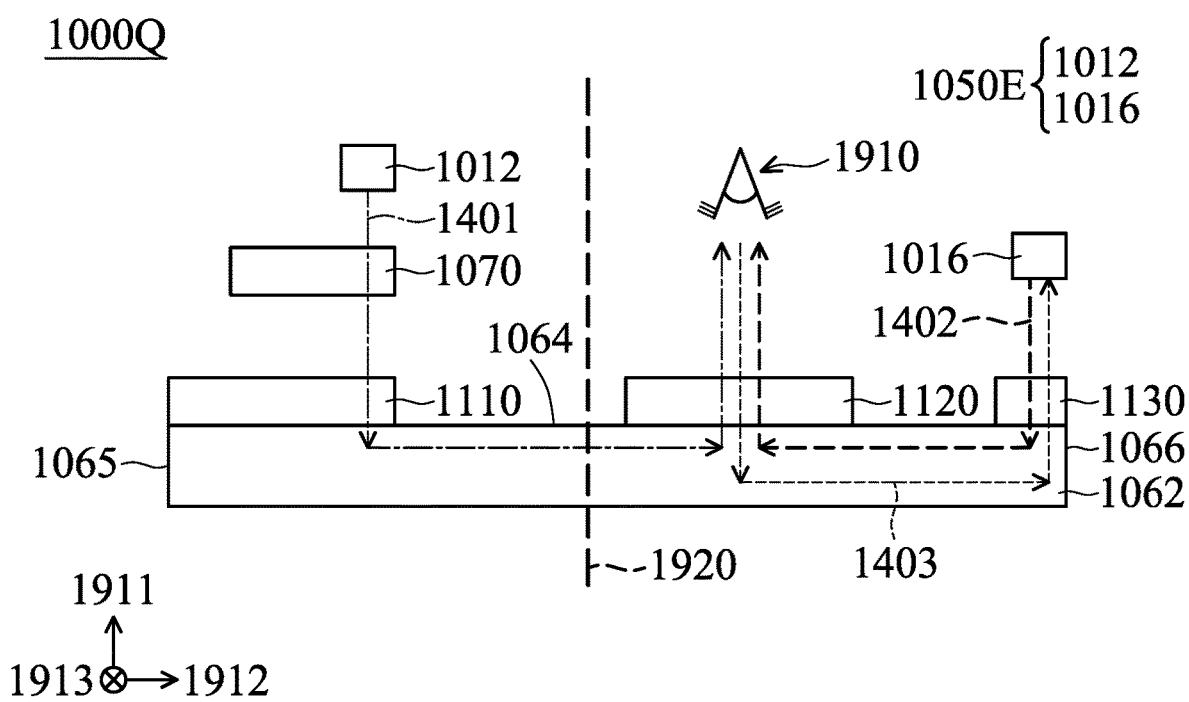
FIG. 14C is a schematic view of an optical system in some embodiments of the present disclosure.

FIG. 14C is a schematic view of an optical system 1000Q in some embodiments of the present disclosure, and elements similar to aforementioned embodiments are not described again. As shown in FIG. 14C, the sensing element and the second light source may be integrated as one piece, such as integrated as a second light source 1016 (such as the embodiment shown in FIG. 6B). The light source assembly 1050E may include a first light source 1012 and a second light source 1016. At this moment, the second light source 1016 may generate the second light 1402, and the third light 1403 may be received by the second light source 1016. Therefore, the numbers of elements in the optical system 1000Q may be reduced to achieve miniaturization.

In summary, an optical system is provided. The optical system includes a light source assembly, a light guiding element, and a first optical assembly. The light source assembly is used for generating first light and second light. The light guiding element is used for transporting the first light and the second light. The first optical assembly is disposed between the light guiding element and the light source assembly and used for transporting the first light and the second light. Wavelengths of the first light and the second light are different. Therefore, eye-tracking function may be performed, and miniaturization may be achieved.

The aforementioned techniques may be applied to optical systems for virtual reality and mixed reality as well, which depends on design requirements.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means,

What is claimed is:

1. An optical system, comprising:
   a light source assembly used for generating a first light and a second light;
   a light guiding element having a first surface facing an eye and used for transporting the first light and the second light; and
   a first optical assembly disposed between the light guiding element and the light source assembly and on the first surface, and used for transporting the first light and the second light, wherein wavelengths of the first light and the second light are different,
   wherein:
   the first optical assembly comprises a first optical element;
   the first optical element comprises a substrate, a plurality of first microstructures, and a plurality of second microstructures;
   the first microstructures and the second microstructures are disposed on the substrate;
   the first microstructures are used for diffracting the first light;
   the second microstructures are used for diffracting the second light.

2. The optical system as claimed in claim 1, wherein:
   the first microstructures are arranged in a first row and a third row;
   the second microstructures are arranged in a second row and a fourth row;
   the first microstructures in the first row extends in a direction parallel to a first axis;
   the second microstructures in the second row extends in a direction parallel to the first axis;
   the first microstructures in the third row extends in a direction parallel to the first axis;
   the second microstructures in the fourth row extends in a direction parallel to the first axis.

3. The optical system as claimed in claim 2, wherein:
   the first row, the second row, the third row, and the fourth row are sequentially arranged in a direction parallel to a second axis;
   the first axis and the second axis are perpendicular.

4. The optical system as claimed in claim 1, wherein:
   the first microstructures comprise a first microstructure first unit and a first microstructure second unit;
   the first microstructure first unit is strip-shaped;
   the first microstructure second unit is strip-shaped;
   the first microstructure first unit extends in a direction parallel to a first axis;
   the first microstructure second unit extends in the direction parallel to the first axis.

5. The optical system as claimed in claim 4, wherein lengths of the first microstructure first unit and the first microstructure second unit are different.

6. The optical system as claimed in claim 5, wherein:
   the second microstructures comprise a second microstructure first unit and a plurality of second microstructure second units;
   the second microstructure first unit is disposed between the first microstructure first unit and the first microstructure second unit;
   the second microstructure second units are arranged along a circle;
   the second microstructure second units surround the first microstructure first unit.

7. The optical system as claimed in claim 6, wherein:
   the second microstructure second units surround the first microstructure second unit;
   the second microstructure second units surround the second microstructure first unit;
   a center of the circle is at the second microstructure first unit.

8. An optical system comprising:
   a light source assembly used for generating a first light and a second light;
   a light guiding element having a first surface facing an eye and used for transporting the first light and the second light; and
   a first optical assembly disposed between the light guiding element and the light source assembly and on the first surface, and used for transporting the first light and the second light, wherein wavelengths of the first light and the second light are different;
   wherein:
   the first optical assembly comprises a first optical element, a second optical element, and a coupling element;
   a plurality of first microstructures are formed on the first optical element;
   a plurality of second microstructures are formed on the second optical element;
   the first microstructures are used for diffracting the first light;
   the second microstructures are used for diffracting the second light;
   the first optical element and the coupling element are arranged along a first axis;
   the second optical element and the coupling element are arranged along the first axis.

9. The optical system as claimed in claim 8, wherein:
   the light guiding element and the light source assembly are arranged along the first axis;
   the first microstructures and the second microstructures do not overlap each other along the first axis.

10. The optical system as claimed in claim 9, wherein:
    the coupling element is disposed between the light guiding element and the first optical element;
    the coupling element is disposed between the light guiding element and the second optical element.

11. The optical system as claimed in claim 10, wherein:
    the light guiding element comprises a first surface;
    the first surface faces the first optical assembly;
    the first optical assembly further comprises a first driving element and a second driving element;
    the first driving element is used for driving the first optical element to move relative to the light guiding element in directions parallel to the first surface;
    the second driving element is used for driving the second optical element to move relative to the light guiding element in directions parallel to the first surface.

12. The optical system as claimed in claim 11, wherein the first axis and the first surface are perpendicular.

13. The optical system as claimed in claim 9, wherein:
    the first optical element is disposed between the light guiding element and the coupling element;
    the second optical element is disposed between the light guiding element and the coupling element.

14. The optical system as claimed in claim 13, wherein the first optical element is disposed between the second optical element and the coupling element.

15. The optical system as claimed in claim 9, wherein:
the first optical element and the second optical element are arranged along a second axis;
the first axis and the second axis are perpendicular;
the first optical element and the second optical element are separated from each other.

16. The optical system as claimed in claim 15, wherein:
the coupling element comprises a first coupling unit and a second coupling unit;
the first coupling unit is disposed on the first optical element;
the second coupling unit is disposed on the second optical element;
the first coupling unit and the second coupling unit are separated from each other.

17. An optical system comprising:
a light source assembly comprising a first surface and used for generating a first light and a second light;
a light guiding element used for transporting the first light and the second light; and
a first optical assembly disposed between the light guiding element and the light source assembly and on the first surface, and used for transporting the first light and the second light, wherein wavelengths of the first light and the second light are different;
a second optical assembly disposed on the first surface;
an intermediate optical assembly disposed on the first surface; and
a sensing element disposed on the light guiding element;
wherein the first surface and a first axis are perpendicular;
the second optical assembly and the intermediate optical assembly are arranged along a second axis;
the first optical assembly and the intermediate optical assembly are arranged along a third axis;
the first axis and the second axis are perpendicular;
the first axis and the third axis are perpendicular;
the second axis and the third axis are not parallel.

18. The optical system as claimed in claim 17, wherein:
the first light sequentially passes through the first optical assembly, the intermediate optical assembly, and the second optical assembly to reach an eye;
the second light sequentially passes through the first optical assembly and the second optical assembly to reach the eye;
the second light does not pass through the intermediate optical assembly.

\* \* \* \* \*